United States Patent [19]

Goubeaux et al.

[11] Patent Number: 4,765,659

[45] Date of Patent: Aug. 23, 1988

[54] HIGH PRESSURE TUBE ATTACHMENT MECHANISM

[75] Inventors: Carl E. Goubeaux, Troy; Donald M. Flory, Arcanum, both of Ohio

[73] Assignee: General Motors Corporation, Detroit, Mich.

[21] Appl. No.: 76,092

[22] Filed: Jul. 21, 1987

Related U.S. Application Data

[63] Continuation-in-part of Ser. No. 891,442, Jul. 28, 1986, abandoned.

[51] Int. Cl.⁴ ............................................. F16L 5/02
[52] U.S. Cl. ................................. 285/215; 285/382.7; 285/422; 182/228
[58] Field of Search ................... 285/189, 382, 382.7, 285/421, 215, 422; 403/368, 374; 182/228

[56] References Cited

U.S. PATENT DOCUMENTS

| 116,098 | 6/1871 | Reynolds | 285/215 |
| 527,883 | 10/1894 | Pratt | 285/215 |
| 718,609 | 1/1903 | Drake | 285/215 |
| 1,304,414 | 5/1919 | Triplett | 285/215 X |
| 2,460,635 | 2/1949 | Herold | 285/382.7 X |
| 3,888,523 | 6/1975 | Bartholomew | 285/382 |
| 4,553,776 | 11/1985 | Dodd | 285/382.7 X |

FOREIGN PATENT DOCUMENTS 15041 of 1898 United Kingdom ............... 285/215

Primary Examiner—Dave W. Arola
Attorney, Agent, or Firm—D. D. McGraw

[57] ABSTRACT

Various embodiments of mechanism for attaching a high pressure tube to an opening in a housing using a tapered opening into which a high pressure tube end is inserted. A securing device is positioned about the tube end and the securing device is pressed fitted into place in the opening so that it is press fitted not only to the housing on an outer diameter portion but also inwardly against the tube end, sealing the opening And the tube so as to hold about 5,000 p.s.i. pressure and also securing the tube against forces tending to move the tube axially or rotationally so as to loosen the tube.

6 Claims, 1 Drawing Sheet

HIGH PRESSURE TUBE ATTACHMENT MECHANISM

This is a continuation-in-part of application Ser. No. 891,442 filed on July 28, 1986 and now abandoned.

The invention relates to mechanisms for attaching the ends of high pressure tubing to a housing which provides appropriate passages for conducting fluid under high pressure to and from the interior of the tubing. It more particularly relates to attachment devices which fit about a tubing end and are press-fitted in place so that the device is secured to both the housing and the tube end by press-fitting.

In one embodiment the device is a cylindrical ferrule which is provided with about a two degree taper on the exterior thereof on a lower portion of the ferrule as illustrated in the drawings. The ferrule is positioned about a tube end, after which the ferrule and the tube end are press-fitted through a housing opening to deform a part of the device by the taper construction of the housing opening so that the device is press-fitted to the housing and also is deformed inwardly to be press-fitted about the end of the tube. The latter press-fitting action may also slightly compress the tube in the area of press-fitting. This will result in both sealing and mechanical retention of the tube in the housing.

Another embodiment uses a similar device which, instead of having the tube extending through the entire ferrule, has a shoulder on an inner portion of the ferrule which is engaged by the tube end. Therefore the tube does not extend entirely through the ferrule.

In still another embodiment the device is a cylindrical ferrule formed as a right circular cylinder is positioned about a tube end, after which the ferrule and the tube end are press-fitted through a housing opening to deform a part of the device by a taper construction of the housing opening so that the device is press-fitted to the housing and also is deformed inwardly to be press-fitted about the end of the tube. The tube may also be slightly inwardly compressed.

It is important that the taper construction of the housing opening, as well as the taper construction of the device when it is tapered beforehand, be at a sufficiently small angle to provide a locking angle. It has been found that about a two degree taper is very desirable for this purpose. When the taper angle increases beyond about 8-10 degrees, it loses it capacity as a locking angle so that the device will not remain press-fitted and locked in place after the press-fitting tool is removed. It is obviously important that the device remain so locked in place after the tool which applies the press-fitting force is removed.

IN THE DRAWING

Figure 1:
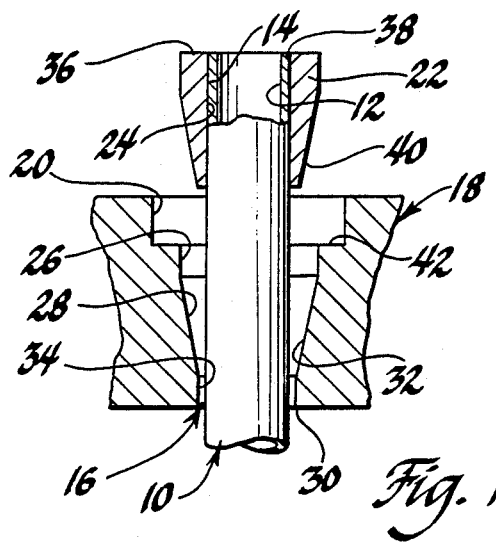
FIGS. 1 and 2 are cross-section views with parts broken away illustrating one embodiment of the invention, with FIG. 1 showing the attachment arrangement before the final securing action takes place and FIG. 2 showing the invention embodiment after the securing action has been completed.

Devices embodying the invention herein disclosed and claimed are particularly useful in attaching the ends of the stainless steel spring tube disclosed in U.S. patent application Ser. No. 728,279 entitled, "Power Booster", filed Apr. 29, 1985 and assigned to the common assignee. In that application, the tube has one end fastened to a housing which is normally fixed in place and the other end fastened to another housing which is moveable. High pressure fluid is delivered through the tube. The manner of fastening the tube ends in that application involves a tapered opening with the tube end being flared after being placed in the tapered opening. The flaring arrangement provides the necessary sealing and retention.

The mechanisms embodying the invention herein disclosed and claimed include an open end attachment device with the tube and extending through and to one end of the device illustrated in FIGS. 1, 2, 5 and 6. The attachment device of FIGS. 3 and 4 has a shoulder on the inner surface thereof which engages the tube end.

Referring now more specifically to the drawing, the tube 10 is preferably annealed stainless steel tubing having an interior passage 12 extending therethrough. As disclosed in the above noted patent application Ser. No. 728,279, it may also function as a spring.

Figure 2:
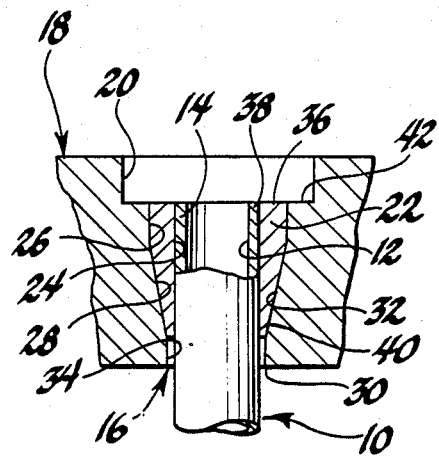

Referring more specifically to FIGS. 1 and 2, one tube end 14 is secured in an opening 16 formed in housing 18 so that the tube interior passage 12 is fluid connected with the space or chamber 20 within housing 18. Space 20 is essentially an extension of the opening 16. The securing device 22 is formed as a partially tapered cylindrical ferrule which has an inner passage 24 of an inner diameter which, in relation to the outer diameter of tube end 14, will permit the device 22 to fit closely but slide over the tube end. This may be readily accomplished by extending the tube end 14 into opening 16 sufficiently far to permit this to occur, as shown in FIG. 1.

Opening 16 is illustrated as being divided into a first section 26 and a second section 28, with first section 26 opening toward space 20 and second section 28 extending from the first section to the outer end 30 of opening 16 from which tube 10 is to extend after being secured in place in housing 18. The opening first section 26 may be cylindrical, and its diameter is sufficiently large to permit device 22 to be placed therein as it fits about tube end 14. The second section 28 of opening 16 has at least a portion 32 thereof conically tapered with about a two degree decreasing diameter taper. In each of the Figures the amount of taper is drawn exaggerated to make the taper obvious. The taper may extend to the outer end 30 of opening 16 or, as illustrated, may stop slightly short of the outer end 30 so that a minor portion 34 of the opening second section 28 is cylindrical but of smaller constant diameter than the diameter of the opening first section 26. The outer end 30 and the minor portion 34 of the opening second section 28 are at least as large as, and preferably slightly larger than, the outer diameter of tube 10.

The device 22 has a transverse end surface 36 facing space 20 after installation and tube end 14 has a similar transverse end surface 38 also facing space 20 after installation, as shown in FIG. 2. Referring now to FIG. 1, these surfaces are substantially aligned in a common plane before the press-fit operation is performed. They are positioned in or adjacent space 20 with the device 22 extending toward or into the opening first section 26 for guiding relation. A suitable press arbor is then used to engage the transverse end surfaces 36 and 38 at their common plane within the housing opening so as to concurrently press the device 20 and the tube end 14 further through the opening 16. The press action causes the end 40 of device 22 to be deformed by the tapered arrangement of the opening second section portion 32, causing the device end 40 to decrease slightly in both inner and outer diameter and press radially inwardly against tube end 14 while also pressing radially outwardly against the tapered second section portion 32, as illustrated in FIG. 2. A shoulder 42 in opening 16 at the juncture of space 20 and the opening first section 26 will act to stop the press arbor and therefore locate the transverse end surfaces 36 and 38 of device 22 and tube end 14 in the plane of that shoulder which is then coincident with the common plane of surface 36 and 38, as shown in FIG. 2. This will also serve to properly locate the device 22 in relation to the tapered portion of opening 16 to acquire the proper press fit needed to secure the tube end 14 to housing 18 for mounting purposes as well as securing it against high pressure leaks.

The locking angle of the conical tapers of device 22 and the housing opening tapered second section 32 locks the device in the opening so that when the press arbor is removed the device 22 and the tube 10 remains secured in place. In the application of the invention to the mechanism of the above noted patent application Ser. No. 728,279, it is required that the tube end hold fluid pressure on the order of about 5,000 p.s.i., and that it resist axial and torsional forces on the tube which would tend to loosen or remove it from opening 16. Tests have indicated a consistent leak-free holding of 12,000 to 15,000 p.s.i. It can be seen that the press fit of device 22 to both the housing 18 and the tube end 14 will form a pressure seal and function as a mechanical retainer for the tube.

Figure 3:
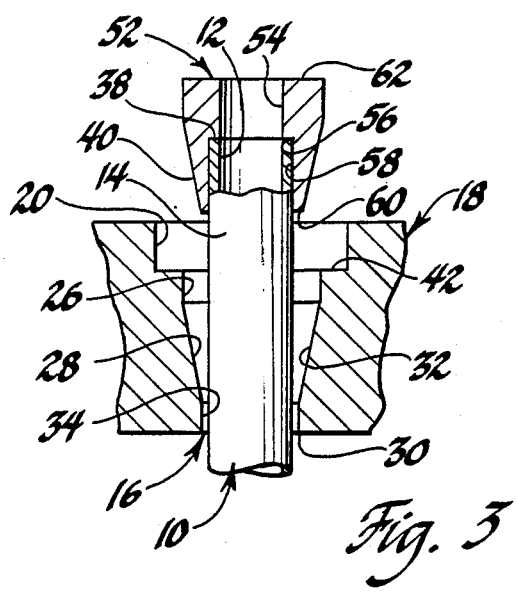
FIGS. 3 and 4 are similar to FIGS. 1 and 2 and illustrate another embodiment of the invention.
Figure 4:
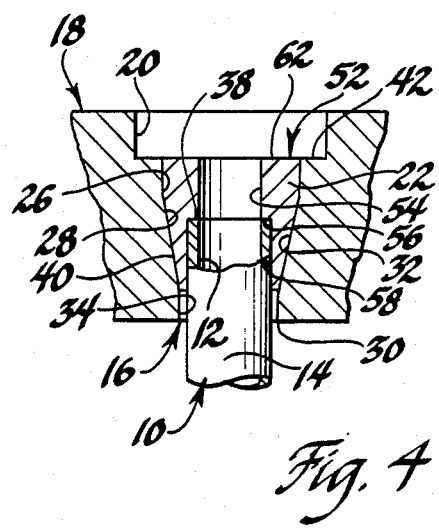

Referring now to FIGS. 3 and 4, housing 18, opening 16 and tube 10 are the same as in FIGS. 1 and 2. The tube end 14, is secured in an opening 16 of housing 18 in a generally similar manner. A somewhat modified securing device 52 is illustrated. The inner passage 54 of securing device 52 has a shoulder 56 formed therein axially part way through the device. Otherwise, the device 52 is constructed like the device 22 of FIGS. 1 and 2.

The lower portion 58 of passage 54 of device 52 (as shown in the drawing) is arranged to receive the tube end 44 for a distance which terminates at shoulder 56. This shoulder is engaged by the transverse end surface 38 of tube end 14 in abutting relation. Thus the tube end 14 is inserted into the lower end 60 of axial passage 54 until it abuts shoulder 56. For this purpose the tube will have been extended through opening 16 sufficiently to make this connection before the press fitting operation, as illustrated in FIG. 3. The securing device 52, with the tube end in place as described, is then press fitted into opening 16 as earlier described. The press arbor acting on the transverse end surface 62 of device 52 and shoulder 56 acting on tube end surface 38. The press fit action taking place between the tapered side wall 32 of the opening second section 28 and the tapered end 40 of device 52 acts in the same manner as the second portion of the securing device 22 earlier described. It engages the approximately two degree taper of the tapered portion 32 of opening second section 28 so as to be deformed by the press fitting action to be press fitted to the tapered portion of the housing forming the tapered portion of second section 28, and also is press fitted inwardly to be press fitted against the outer diameter of tube end 14 to secure and seal the tube in place as illustrated. The tube end 14 may be slightly compressed as a result of the press fitting, as before. As in the embodiment earlier described, the securing and sealing action of tube 10 at its end 14 must also hold a pressure of about 5,000 p.s.i. as well as hold the tube in place against forces tending to loosen it axially or rotationally.

Figure 5:
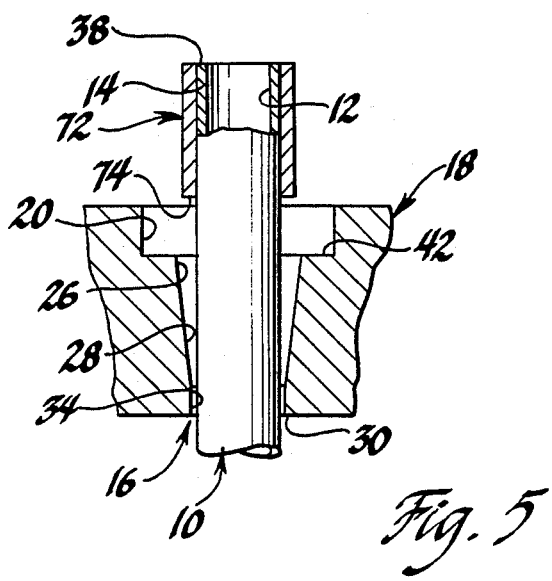
FIGS. 5 and 6 are also similar to FIGS. 1 and 2 and illustrate another embodiment of the invention.
Figure 6:
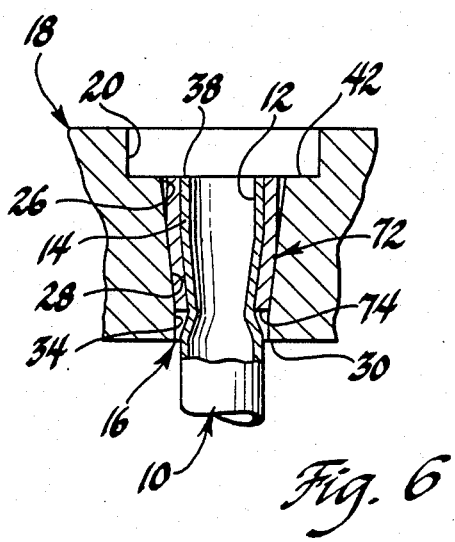

The embodiment shown in FIGS. 5 and 6 includes a securing device 72 which is similar to the securing device 22 of FIGS. 1 and 2. However, it does not have a tapered portion. Instead, it is formed as a right circular cylinder with all of the press-fitting deformation being achieved as the cylindrical device is forced into the tapered portion 32 of the housing opening 16. It is preferred that the first section 26 of opening 16 be also tapered to assist in guiding the lower end 74 of device 72 as the device is moved into opening 16 at the beginning of the press operation.

FIG. 6 shows the attachment mechanism in the secured position. It over emphasizes the compressed inward deformation of the tube end 14.

Housings 18 may be made of steel, cast iron, aluminum or a suitable aluminum alloy, by way of example. The securing devices 22, 52 and 72 are preferably made of annealed stainless steel or brass. Tube 10 is preferably made of spring stainless steel.

The embodiments of the invention in which an exclusive property or privilege is claimed are defined as follows:

1. A high pressure tube attachment mechanism comprising:
   a housing having an opening therein through which hihg pressure fluid may be conducted;
   a high pressure tube having an inner cylindrical surface and an outer cylindrical surface respectively having an inner surface diameter and an outer surface diameter, said tube also having one end positioned in said housing opening in open relationship thereto so as to transmit fluid pressure between said opening and the interior of said tube;
   and a securing device having at least an axially extending tube-like first portion thereof received about said tube one end and within said opening in press fitted sealing relation to said tube one end and to said housing;
   said housing opening having a first section defined by a right cylindrically formed wall surface and a second section extending from said first section, said second section having a wall surface with at least a portion thereof conically tapered with about a two degree decreasing diameter taper providing a locking angle, said second section terminating at the outer end said housing opening from which said tube extends when secured in place, the minimum wall surface diameter of said housing opening being greater than the outer surface diameter of said tube one end, said tube one end extending axially into said opening outer end and at least through a major portion of the conically tapered portion of said housing opening second section;
   said securing device haivng an axially extending second portion extending inwardly of said housing opening, said securing device first and second portions having outer surfaces, the outer diameters of which are less than the diameter of said housing opening first section wall surface and an inner surface having an inner diameter and in which said tube one end is slidably received in at least a part of said securing device prior to final assembly of said attachment arrangement, said securing device first portion having an end extending toward said outer end of said housing opening and fitting into said tapered second section of said housing opening, said securing device having been axially pressed to extend into said housing opening tapered second section and by press fit tapered deformation be outwardly press fitted to said housing opening tapered second section and also be inwardly press fitted to said tube one end to a sufficient extent to sealingly secure said tube one end to said housing by press-fitted locking angle action so as to hold fluid pressure on the order of 5,000 p.s.i. and to hold said tube securely in said housing opening against axial and rotational removal forces tending to remove said tube from said housing.

2. The tube attachment mechanism of claim 1, said securing device having a transverse end surface and said tube one end having a transverse end surface, said transverse end surfaces being in a common plane within said housing opening during and after the press fitting action so that tube one end extends coextensively through said securing device, and the axially exerted press fitting force during the press fitting action is exerted on both of said securing device and said tube one end transverse end surfaces.

3. The tube attachment mechanism of claim 1, said securing device having a shoulder section formed in said securing device inner surface and said tube one end having a transverse end surface in abutting engagement with said shoulder section during and after the press fitting action to provide axial location of said tube one end relative to said securing device and said housing opening.

4. A high presusre tube attachment mechanism comprising:
 a housing having an opening therein through which high pressure fluid may be conducted;
 a high pressure tube having an inner cylindrical surface and an outer cylindrical surface respectively having an inner surface diameter and an outer surface diameter, said tube also having one end positioned in said housing opening in open relationship thereto so as to transmit fluid pressure between said opening and the interior of said tube;
 and a securing device having at least an axially extending tube-like first portion thereof received about said tube one end and within said opening in press fitted sealing relation to said tube one end and to said housing;
 said housing opening having a first section defined by a right cylindrically formed wall surface and a second section extending from said first section, said second section having a wall surface with at least a portion thereof conically tapered with about a two degree locking angle decreasing diameter taper, said second section terminating at the outer end of said housing opening from which said tube extends when secured in place, the minimum wall surface diameter of said housing opening being greater than the outer surface diameter of said tube one end, said tube one end extending axially into said opening outer end and at least through a major portion of the conically tapered portion of said housing opening second section;
 said securing device having an axially extending second portion extending inwardly of said housing opening, said securing device first and second portions having outer surface, the outer diameters of which are less than the diameter of said housing opening first section wall surface and an inner surface having an inner diameter and in which said tube one end is slidably received in at least a part of said securing device prior to final assembly of said attachment arrangement, said securing device first portion having an end extending toward said outer end of said housing opening and fitting into said tapered second section of said housing opening, said securing device having been axially pressed to extend into said housing opening tapered second section and by press fit tapered deformation be outwardly press fitted to said housing opening tapered second section and also be inwardly press fitted to said tube one end to a sufficient extent to sealingly secure said tube one end to a sufficient extent to sealingly secure said tube one end to said housing so as to hold fluid pressure on the order of 5,000 p.s.i. and to hold said tube securely in said housing opening by press-fitted locking angle action against axial and rotational removal forces tending to remove said tube from said housing;
 said securing device being a cylindrical ferrule which was of a uniform inner and outer diameter before being pressed into said housing opening tapered second section and after being so pressed has a decreased inner diameter about said tube one end and a tapered outer diameter engaging said housing opening tapered second section radially outwardly of at least a portion of said tube one end.

5. The tube attachment mechanism of claim 4 in which said securing device is made of annealed stainless steel and said tube is made of spring stainless steel.

6. The tube attachment mechanism of claim 4 in which said securing device is made of brass and said tube is made of spring stainless steel.

* * * * *